United States Patent Office 3,275,682
Patented Sept. 27, 1966

3,275,682
PRODUCTION OF SURFACE-ACTIVE
ETHER SULFONATES
Pieter M. Bakker and Hendrik Buesink, Amsterdam,
Netherlands, assignors to Shell Oil Company, New
York, N.Y., a corporation of Delaware
No Drawing. Filed May 23, 1963, Ser. No. 282,569
Claims priority, application Netherlands, May 29, 1962,
279,025
7 Claims. (Cl. 260—513)

This invention relates to higher alkyl ethers of hydroxysulfonates and deals with an especially advantageous method for producing compounds of this type in an economical and efficient manner from olefinic starting materials.

It has already been proposed to produce surface active sulfonate ethers, but these products have achieved no significant commercial use because they have been inherently expensive to manufacture by the methods heretofore available. These methods have required the use of higher alcohols as starting materials which were reacted with carbyl sulfate, isethionic acid, or the like and the sulfonic acid product then neutralized to make the sulfonate. The starting materials for these processes are undesirably costly, and high yields are not always obtained in all the steps involved.

A principal object of the present invention is to provide an efficient method for producing surface-active higher alkyl ether sulfonates from economical starting materials. A more particular object is the provision of a method for producing such sulfonates from olefinic mixtures. A special object of the invention is the production of high quality surface-active sulfonate ethers from olefinic fractions of hydrocarbon cracking products efficiently and at low cost. Still another object is the provision of new ether sulfonates which not only have outstanding foaming properties and meet other requirements of high-quality detergents but also are more readily biodegradable than has been the case with synthetic detergents in widest use up to now, so avoid the problems which the latter create in waste disposal. These and other objects and advantages of the invention will be better understood from the following description of the new process in certain of its more advantageous modifications.

Now, in accordance with this invention, it has been found that secondary alpha-olefins react more rapidly with halohydrins in the presence of acid catalysts than do other secondary olefins having their double bond removed from the end of the chain, so can be selectively converted to haloethers while leaving a substantial amount of unetherified nonalpha olefin. Based upon this discovery a two-step method has been developed for producing advantageous sulfonate ethers from mixtures of higher olefins. In this new method, the chosen halohydrin starting material is first reacted selectively with alpha-olefins to effect substantial conversion of the alpha-olefins to halogen substituted ethers while leaving a substantial amount of olefin having the double bond removed from the end of the chain unetherified in the mixture. The haloether thus produced is then reacted with water-soluble sulfite to make the corresponding ether sulfonate. The reactions involved in a preferred modification of the invention are illustrated by the following equations:

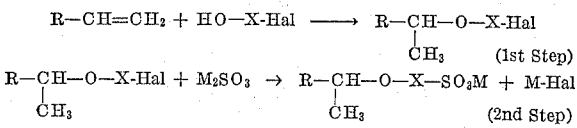
(1st Step)

(2nd Step)

Here R represents an alkyl group of at least six carbon atoms, X is an alkylene group of two to four carbon atoms having the halogen atom, Hal, and hydroxyl group linked to different carbon atoms, preferably to adjacent carbon atoms, and M is a cation, advantageously a monovalent cation, preferably hydrogen, alkali metal, or ammonium.

Preferred starting olefins for the new process are the fractions of technical olefins having a high nontertiary alpha-olefin content which can be obtained by thermal or catalytic cracking of hydrocarbon feedstocks, e.g., the wax fractions produced in dewaxing luboils, or the raffinate obtained by the selective solvent extraction of heavy catalytically cracked cycle oil, or the n-paraffins separated from straight-run kerosene and gas-oil fractions by urea or molecular sieve fractionation to lower the pour point. Especially preferred are the predominantly straight-chain olefins containing at least 8 carbon atoms per molecule of the type obtainable by cracking solid paraffin hydrocarbon wax in the vapor phase in the presence of steam, but analogous olefins from other sources can also be used. With these starting olefins sulfonate ethers having the previously mentioned advantage of ready biodegradability are obtained. Where this advantage is not essential, one can use olefins with more branched chain structure although it is generally preferable that the side chains be lower alkyl, most desirably methyl groups. In any case it is desirable to use secondary olefins or olefin mixtures which predominate in secondary olefins that is, olefins which have no branching at the doubly bonded carbon atoms. Mixtures of alkenes with, for instance, from 8 to 20, or, more preferably about 12 to 16 carbon atoms per molecule are especially suitable.

Examples of alkylene halohydrins which can be reacted with the alpha-olefins in the first step of the process are ethylene chlorohydrin, propylene chlorohydrin, butylene chlorohydrin, and the chlorohydrins derived from glycerol. Instead of these chlorohydrins one can use the corresponding bromohydrins and/or iodohydrins, but these are generally more expensive starting materials.

The reaction between the olefins and halohydrin is carried out in the presence of acid catalysts. Preferred acid catalysts are BF$_3$ and sulfuric acid, which cause the reaction to proceed at relatively low temperatures. In addition, other acids are also suitable, particularly the strong acids such as phosphoric acid and hydrochloric acid, the aromatic sulfonic acids and chloroacetic acid. Very suitable also are Lewis acids other than BF$_3$, such as the other boron halides and the aluminium halides, such as AlCl$_3$ and AlBr$_3$. Generally elevated temperatures are applied, for instance, between 50 and 200° C., particularly between 60 and 120° C., pressure being applied, if necessary, to prevent boiling.

The ratios in which the alkenes, halogen hydrins and catalysts are mixed may be varied widely. Considerable deviations from the stoichiometric ratios may be made. If use is made of BF$_3$, preference is given to molecular ratios of halogen hydrin to alkene of from 3:1 to 10:1, particularly from 5:1 to 7:1. The quantity of BF$_3$ in that case is preferably taken to be from 3 to 15 percent by weight, particularly from 5 to 10 percent by weight calculated on halogen hydrin. If use is made of sulfuric acid, preference is given to molecular ratios of halogen hydrin to alkene of from 1:2 to 1:8; in that case the molecular ratio of sulfuric acid to halogen hydrin preferably has a value of from 0.5:1 to 1:1. The presence of some water is favorable. Mostly water is used in a quantity of from 0.3 to 1 mole, particularly from 0.4 to 0.6 mole, per mole of BF$_3$ and in a quantity of from 1 to 5 percent by weight, for instance 2 percent by weight, in the sulfuric acid.

In some cases the presence of a solvent or diluent, particularly a polar solvent, may be advantageous. Suitable solvents for the purpose in question at the reaction temperature generally show a dielectric constant of at least 5. Solvents which at the reaction temperature have a dielectric constant of at least 10 are in general the most satisfactory. Suitable are, for instance, nitromethane, nitroethane, dioxane, 1,2-dimethoxyethane, furane, and sulfolane.

Due to the faster rate of reaction of secondary alpha-olefins under the foregoing conditions, these olefins can be substantially reacted with incomplete conversion of the internal olefins present so as to obtain as product a mixture of halo-ethers predominating in those having the ether oxygen atom linked to the second carbon atom of the higher alkyl chain. Reaction times of about ¼ to about 10 hours, more preferably usually about 1 to about 5 hours are suitable.

For the separation of the halogen-containing ether from the reaction mixture various methods can be applied. A recommended method is extraction of the halogen-containing ether with suitable extracting agents, for instance hydrocarbons or ethers. If necessary, the solvent or diluent that was present during the reaction may be removed, which as a rule will be done by distillation. Instead of this extraction, or by way of a treatment preceding the extraction, dilution of the reaction medium with water may be applied, as a result of which an immediate separation is effected between the desired product and the compounds which are soluble in water.

In the second step of the process in which the halogen-containing ethers from the first step are converted to sulfonates, the process according to the invention generally uses alkali or ammonium sulfites. A suitable medium for this reaction is water or, otherwise, a liquid in which both the halogen-containing ether and the sulfite are soluble to some extent. Examples of liquids of this type are: mixtures of water and alcohols, for instance, methanol, ethanol or isopropanol, mixtures of water and ketones, for instance acetone, and mixtures of water and ethers, for instance dioxane. The temperature at which this reaction is allowed to take place is preferably chosen so as to lie between 100 and 200° C. If necessary, pressure is applied to prevent the liquid from boiling. The ratio in which the halogen-containing ether and the sulfite are mixed may be the stoichiometric one, although this is not at all strictly necessary, but deviations from it are quite possible. It is recommended to use a quantity of sulfite which is from 1.5 to 8 times as large as the stoichiometric one. Reaction times of about 2 to about 20 hours are usually suitable in this step of the process.

If desired, excess sulfite can afterwards be removed from the product by addition of alcohols, for instance ethanol or isopropanol; if desirable, this treatment is preceded by boiling down of the solution. Remnants of the halogen-containing ether are, if necessary, removed by extraction, for instance with a mixture of diethyl ether and pentane and the ether sulfonate in purified form can then be obtained by distilling off the solvent. Alternatively, the higher alkyl ether sulfonate mixture which is obtained can be used in the liquid medium in which it is formed.

Instead of sulfites, substances from which sulfites are formed, such as hydrosulfites, acid sulfites and sulfur dioxide may be used, either in combination with an alkali hydroxide or not.

The following examples illustrate in more detail suitable methods of carrying out the new process.

Example I

In a mixture of 6 mole 2-chloroethanol (=463 g.) and 3.6 g. $H_2O$ (=0.2 mole), a quantity of 0.5 mole $BF_3$ (=34 g.) was introduced at room temperature, with stirring and cooling. Subsequently a fraction of products of vapor phase cracking of solid paraffin wax consisting mainly of alkenes with 12 carbon atoms, predominantly straight chain alpha-olefins was added in an amount corresponding to a mole of olefin, and the mixture while being stirred, brought to a temperature of 95° C. This temperature was maintained for 5 hours. Next, the reaction mixture was cooled down to room temperature and extracted three times with 100 ml. pentane. After washing with water and evaporating of pentane the residue was distilled off in vacuo. As a result, 0.65 mole of dodecyl-beta-chloroethyl ether was obtained, predominantly 2-dodecyl-beta-chloroethyl ether boiling at 175° C. at 23 mm. Hg, the internal olefins present in the reaction mixture being largely recovered in unreacted form by the extraction with pentane.

The beta-chloroethyl ether was dissolved in five times its weight in methanol. Sodium sulfite was dissolved in five times its weight in water. The two solutions were mixed in a ratio of 1:1 by weight. The molecular ratio of the ether to the sulfite was approximately that of 1:2. In an autoclave the mixture was kept at 165° C. for 4 hours while being stirred. After cooling down to room temperature so much water was added that the ratio by weight of water to methanol was as 4:1 and extraction with a mixture of equal parts by weight of diethyl ether and pentane was applied. After evaporation of the greater part of the water, a separation was effected between the sulfonate and the inorganic salts by addition of isopropanol. The yield of secondary dodecyl-beta-sulfoethyl ether sodium salt was 48 mole percent based on the chloroether used.

Foaming tests of this product in aqueous solution of 230 p.p.m. water hardness carried out at 45° C. as described in The Netherlands patent specification 97,122 showed a foaming power of 139 compared with that of a solution of sodium secondary alkyl sulfates with from 8 to 18 carbon atoms as 100.

Example II

Reaction of a $C_{14}$ olefin fraction of cracking products of solid paraffin wax was carried out with 2-chloro-ethanol ether by the same method as Example I so that reaction of the alpha-olefins with minimized conversion of the internal olefins present was effected. The resulting secondary tetradecyl-beta-chloroethyl ethers were converted inxo sulfonates by reaction with sodium sulfite in aqueous solution at 165° C. for 18 hours using two moles of sulfite per mole of ether. The yield of secondary tetradecyl-beta-sulfoethyl ether sodium salt was 65% calculated on the beta-chloro-ethyl ether and the product had a foaming power of 179 when tested by the method described in Example I.

Example III

Reaction of a $C_{12}$–$C_{16}$ olefin fraction of products of vapor phase cracking of solid paraffin wax in the presence of steam using the method of Example I so as to substantially convert the alpha-olefin content with only partial conversion of the internal olefins present in the reaction mixture followed by reaction of the mixture of secondary $C_{12}$–$C_{16}$ alkyl-beta-chloroethyl ethers with sodium sulfite results in a similar good yield of alkyl ether sodium sulfonates which have high foaming power and good detergency.

Example IV

Reacting the $C_{14}$ olefin fraction of Example II in the same way but using 1-chloro-2-propanol in the same mole proportion intsead of the 2-chloro-ethanol, separating the tetradecenes with internal double bonds from the secondary tetradecyl-alpha-methyl-beta-chloroethyl ether, and reacting with sodium sulfite in the same way gives the corresponding sodium sulfonate of high foaming power and good detergency.

Substituting ammonium sulfite for the sodium sulfite in this process results in a similarly good yield of the ammonium salt of the tetradecyl sulfo-isopropyl ether.

Example V

A fraction of solid paraffin wax cracking products of which 90% consisted of straight chain $C_{12}$ olefins, predominantly alpha-olefins, was reacted with 2-chloroethanol and 98% sulfuric acid in a mole ratio of 3:1:0.5 for 5½ hours with vigorous stirring at 70° C. The by-product mono- and di-alkyl sulfates formed by reaction of the acid with the olefins were hydrolyzed by refluxing after dilution with water and isopropanol. The aqueous phase of the resulting mixture is separated and the beta-chloroethyl secondary $C_{12}$ alkyl ethers produced were recovered by washing the organic phase with aqueous ethanol to remove inorganic acid and unreacted 2-chloroethanol and then distilling under reduced pressure. A 42% yield of secondary dodecyl beta-chloroethyl ether boiling at 280°–290° C. at 760 mm. and substantially composed of the 2-dodecyl ether was obtained. Reaction of this product with sodium sulfite under the conditions of Example I gives a good yield of the corresponding sodium sulfonates having good foaming properties.

Example VI

The ready biodegradability of the sulfonate ethers produced by the process of the invention when using predominantly straight chain olefins as starting material is shown by the following results of tests made with a fraction of olefins from the cracking of urea extracted paraffin wax. The fraction contained 90% straight chain $C_{13}$–$C_{15}$ olefins. It was mixed with 2-chloroethanol, boron trifluoride, and water in a mole ratio of 1:6:0.5:0.18 and the mixture was stirred for 4 hours at 95° C. The reacted mixture cooled to ambient temperature was extracted four times with pentane, washed with 20% ethanol, and $C_{13}$–$C_{15}$ secondary alkyl beta-chloroethyl ether was recovered by distillation in 67 mole percent yield based on the olefin intake. The recovered unreacted olefins corresponded to about 30% by weight of the olefins fed and boiled at 135°–286° C., and were composed of about 95% internal olefins.

The secondary alkyl ether, largely 2-alkyl ether, was flashed distilled and reacted with 5 moles of sodium sulfite in the presence of one mole of water at 185° C. in liquid phase for 12 hours to obtain the corresponding sulfonate in 81% yield based on the chloroether intake. The recovered product was subjected to a standard accelerated biodegradation test in comparison with a commercial dodecylbenzene sodium sulfonate with results as follows:

|  | Percent of Original Sulfonate After— | | | |
|---|---|---|---|---|
|  | 1 Day | 2 Days | 3 Days | 4 Days |
| $C_{13}$–$C_{15}$ sec. alkyl ethyl ether sodium sulfonate | 63 | 16 | 3 | 2 |
| Dodecylbenzene sodium sulfonate | 74 | 55 | 40 | 33 |

The sulfonates obtained according to the invention may, besides being used as components of liquid detergents, also serve as components of detergents in powder form. The invention also includes the preparation of these compositions in which the sulfonates in question are mixed with one or more known components of detergents or cleansing agents. Examples of these known components are: other surface-active compounds, alkali pyrophosphates or polyphosphates, silicates, carbonates, sulfates, borates, sodium carboxymethylcellulose or other soluble derivatives of cellulose or starch, persulfates, perborates, percarbonates, optically active bleaching agents, foaming and foam-stabilizing substances. The process of the invention provides alkyl ether sulfonates of highly advantageous properties for these uses. It can also be used for the preparation of internal olefins substantially free of alpha-olefins using alpha-olefin containing starting materials. Either or both steps of the process can be carried out continuously or intermittently instead of by the batch methods illustrated in the examples. It will thus be seen that the process is capable of many applications and is not limited to the examples which have been given by way of illustration. Nor is the invention limited to any theory proposed in explanation of the improved results which are obtained.

We claim as our invention:

1. A process for producing surface-active higher alkyl ethers of hydroxyalkane sulfonates from a hydrocarbon fraction containing olefins which are predominantly secondary olefins having at least 8 but not more than about 20 carbon atoms per molecule and consisting of secondary alpha-olefin of the formula R—CH=CH$_2$ where R represents alkyl of 6 to 18 carbon atoms together with secondary olefin having the double bond removed from the end of the chain, which comprises (1) reacting said hydrocarbon fraction with an alkylene halohydrin of the formula HO—X-Hal where X represents alkylene of 2 to 4 carbon atoms, and Hal is halogen of the group consisting of chlorine, bromine, and iodine in the presence of an acid catalyst to effect substantial conversion of secondary alpha-olefin to predominantly haloalkyl ether of the formula

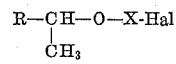

wherein R repersents alkyl of 6 to about 18 carbon atoms, X is alkylene of 2 to 4 carbon atoms, and Hal is halogen of the group consisting of chlorine, bromine, and iodine and stopping the reaction while substantial internal olefin remains unconverted in the mixture, and (2) reacting the resulting haloalkyl ether predominating in ether as above defined with a water soluble sulfite to effect replacement of the halogen by a sulfonate group and formation of said surface active product.

2. A process in accordance with claim 1 wherein a fraction of hydrocarbon cracking products predominating in straight chain olefins having 12 to 16 carbon atoms per molecule is reacted with 2-chloroethanol and the resulting product of the formula

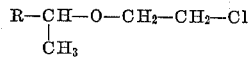

where R represents alkyl of 10 to 14 carbon atoms is converted to the corresponding sulfonate by reaction with alkali metal sulfite.

3. A process for producing surface-active alkyl ethers of hydroxyalkane sulfonates which are readily biodegradable from a fraction of olefins from vapor phase cracking of solid paraffin wax and containing predominantly straight chain alpha-olefins of at least 8 but not more than about 20 carbon atoms per molecule which comprises reacting said fraction in the liquid phase with a molar excess of 2-chloroethanol in the presence of boron trifluoride catalyst, stopping said reaction when substantial conversion of said alpha-olefins to ether of the formula

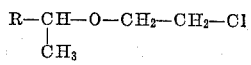

where R is alkyl of 6 to about 18 carbon atoms has taken place, but substantial internal olefin remains unconverted in the mixture, separating the resulting secondary alkyl beta-chloroethyl ether from the internal olefins present therewith in the reaction mixture, and reacting the recovered secondary alkyl beta-chloroethyl ether with a stoichiometric excess of water soluble sulfite to convert the chloroethyl ether to the corresponding sulfonate ether.

4. A process in accordance with claim 3 wherein the reaction of said olefins with 2-chloroethanol is carried out using 3 to 10 moles of 2-chloroethanol per mole of olefin at 50° to about 200° C. in the presence of about 3 to about 15% of boron trifluoride based on the weight of 2-chloroethanol employed.

5. A process in accordacne with claim 4 wherein the reaction of the olefins with 2-chloroethanol is conducted in a solvent having a dielectric constant of at least 5 and the reaction is stopped when the alpha-olefins are substantially completely converted.

6. A process in accordance with claim 4 wherein said secondary alkyl beta-chloroethyl ether is reacted with alkali metal sulfite at about 100° to about 200° C. in an inert mutual solvent for the reactants under sufficient pressure to maintain the mixture substantially in the liquid phase.

7. A process for producing surface-active higher alkyl ethers of hydroxyalkane sulfonates from a fraction of predominantly secondary olefin having at least 8 but not more than about 20 carbon atoms per molecule which comprises reacting said fraction in the liquid phase with 2-chloroethanol in the presence of sulfuric acid catalyst using a mole ratio of halohydrin to olefin of 1:2 to 1:8 and 0.5 to 1 mole of sulfuric acid per mole of halohydrin and about 1 to about 5% wt. water in the sulfuric acid, the reaction being conducted in the liquid phase at about 60° to about 120° C., stopping the reaction when substantial production of ether of the formula $$R-\underset{\underset{CH_3}{|}}{CH}-O-CH_2-CH_2-Cl$$

where R is alkyl of 6 to about 18 carbon atoms from the alpha-olefin present has taken place without substantially reacting internal olefin with the 2-chloroethanol, separating the secondary alkyl beta-chloroethyl ether from the reaction mixture, and reacting the recovered alkyl-beta-chloroethyl ether in the liquid phase with water soluble sulfite at about 100° to about 200° C. to effect replacement of the chlorine by a sulfonate group.

References Cited by the Examiner
UNITED STATES PATENTS

| | | | |
|---|---|---|---|
| 1,968,601 | 7/1934 | Edlund et al. | 260—614 |
| 2,094,489 | 9/1937 | Hueter et al. | 260—513 |
| 2,316,538 | 4/1943 | Orthner et al. | 260—513 |
| 2,544,392 | 3/1951 | Moore et al. | 260—614 |
| 2,925,316 | 2/1960 | Hofer | 260—513 |
| 3,121,124 | 2/1964 | Verdol | 260—614 |

LORRAINE A. WEINBERGER, *Primary Examiner.*

LEON ZITVER, *Examiner.*

B. EISEN, M. WEBSTER, *Assistant Examiners.*